United States Patent
Yang et al.

(10) Patent No.: US 8,140,534 B2
(45) Date of Patent: Mar. 20, 2012

(54) SYSTEM AND METHOD FOR SORTING ATTACHMENTS IN AN INTEGRATED INFORMATION MANAGEMENT APPLICATION

(75) Inventors: Chunhui Yang, Durham, NC (US); Joseph M. Dennis, Tallahassee, FL (US); Lanness G. Robinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 11/833,487

(22) Filed: Aug. 3, 2007

(65) Prior Publication Data
US 2009/0037407 A1 Feb. 5, 2009

(51) Int. Cl.
*G06F 17/00* (2006.01)
(52) U.S. Cl. .................. 707/741; 707/753; 709/206
(58) Field of Classification Search .................. 707/753, 707/741; 709/206
See application file for complete search history.

(56) References Cited

U.S. PATENT DOCUMENTS

| | | | |
|---|---|---|---|
| 2003/0009536 A1* | 1/2003 | Henderson et al. | 709/219 |
| 2008/0133501 A1* | 6/2008 | Andersen et al. | 707/5 |
| 2008/0201668 A1* | 8/2008 | Roy | 715/854 |
| 2010/0191818 A1* | 7/2010 | Satterfield et al. | 709/206 |

* cited by examiner

*Primary Examiner* — Belix M Ortiz
(74) *Attorney, Agent, or Firm* — Jeffrey T. Holman (57) ABSTRACT

A system and method to sort attachments in an integrated information management application. The system includes an email agent, and email repository, and an attachment engine. The email agent facilitates organization of email communications within the integrated information management application. The email repository is coupled to the email agent. The email repository stores a plurality of email files and a plurality of email attachments. The email attachments are associated with at least some of the email files. The attachment engine is coupled to the email agent. The attachment engine generates a list of the email attachments within the email repository for visual communication on a display device.

20 Claims, 7 Drawing Sheets

SYSTEM AND METHOD FOR SORTING ATTACHMENTS IN AN INTEGRATED INFORMATION MANAGEMENT APPLICATION

BACKGROUND OF THE INVENTION

Email is a useful tool to transfer files from one person to another. Typically, files are attached to and delivered with the email message. In particular, the files may be sent as a separate message or, more commonly, attached to the content of the email in a single multipart message.

Given the storage capacity available on most computer systems, email messages and their attachments are often stored within an email system for long periods of time. Over time, the number of email messages and attachments can be difficult to manage. In particular, it is often difficult for a user to find an attached document in an email system, unless the user knows when the email message was sent or received, who sent or received the email message, or which folder stores the email message. Therefore, it can take a long time to search for attachments in an email system.

In some instances, conventional email systems allow a user to sort the email messages within the email system, or within a folder of the email system. Using such email message sorting functionality, a user might to try to find a document attached to one of the email messages. Some conventional email systems allow a user to group emails with attachments together at the beginning or end of a comprehensive list of emails in a folder. As a result, the emails without attachments are grouped at the other end of the email list. However, there is no sorting performed among the emails with attachments based on the characteristics of the attachments. The sorting is only based on the presence of an attachment. In a related manner, some conventional email systems implement a batch process to scan emails for attachments, remove the attachments from the emails, and save the attachments to a separate database. However, this type of batch process does not implement any further sorting based on the characteristics of the attachments, except to identify which emails have attachments.

Alternatively, if the user knows the approximate size of the attached document, then the user can sort the email messages by size and try to find the email message with the attached document the user is looking for. However, sorting email messages by size can still take a long time to find a particular attachment because each email message is separately opened and viewed to determine if the correct file is attached. Additionally, sorting emails by size can lead to inaccurate results because email message sorting depends on the total size of each email message. Since each email message may include multiple attachments, large embedded images, or compressed files, the total size of the email message is not necessarily indicative of the size of an attached file. Thus, an email list sorted according to size may combine emails with and without attachments.

SUMMARY OF TH INVENTION

Embodiments of a system are described. In one embodiment, the system is a system to sort attachments in an integrated information management application. An embodiment of the system includes an email agent, an email repository, and an attachment engine. The email agent facilitates organization of email communications within the integrated information management application. The email repository is coupled to the email agent. The email repository stores a plurality of email files and a plurality of email attachments. The email attachments are associated with at least some of the email files. The attachment engine is coupled to the email agent. The attachment engine generates a list of the email attachments within the email repository for visual communication on a display device. Other embodiments of the system are also described.

Embodiments of a method are also described. In one embodiment, the method is a method for sorting attachments in an integrated information management application. An embodiment of the method includes searching a data repository of an integrated information management application for files with attachments and generating a list of the attachments within the data repository. The method also includes sorting the list of attachments according to a sorting qualifier and displaying the sorted list of attachments on a display device. Other embodiments of the method are also described.

Embodiments of an apparatus are also described. In one embodiment, the apparatus is a computer program product comprising a computer useable storage medium to store a computer readable program that, when executed on a computer, causes the computer to perform certain operations. In one embodiment, the operations include an operation to search a data repository of an integrated information management application for files with attachments and an operation to generate a list of the attachments within the data repository. The operations also include an operation to sort the list of attachments according to a sorting qualifier and an operation to display the sorted list of attachments on a display device. Other embodiments of the apparatus are also described.

Other aspects of embodiments of the system, method, and apparatus will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate sorting attachments in an integrated information management application. An exemplary integrated information management system includes Lotus Notes®. This and other integrated information management systems incorporate multiple workspaces (e.g., an email workspace, a calendar workspace, a task workspace, etc.) into a single software application that may be stored and executed on a computer system. Alternatively, some embodiments facilitate sorting attachments in a standalone application such as an email system.

Prior to or in combination with sorting the attachments, a list of the attachments may be displayed on a display device. The list of attachments includes one or more attachment attributes such as name, date, size, type, author, recipient, folder, or other attachment attributes. In some embodiments, buttons or other user interface tools allow a user to sort the listed attachments based on a sorting qualifier corresponding to one of the attachment attributes. For example, the attachments may be sorted by name, size, date, and so forth. The specific sorting qualifiers used in a particular embodiment may be selected from a list of sorting qualifiers which may be accessed, for example, by opening a list of column headers for a window interface. In certain embodiments, sorting and displaying the attachments in this manner facilitates direct management of the attachments, rather than indirect management through manipulation of the email messages, calendar entries, or other workspace items. Additional functionality of the various embodiments is described in more detail below with reference to the corresponding figures.

Figure 1:
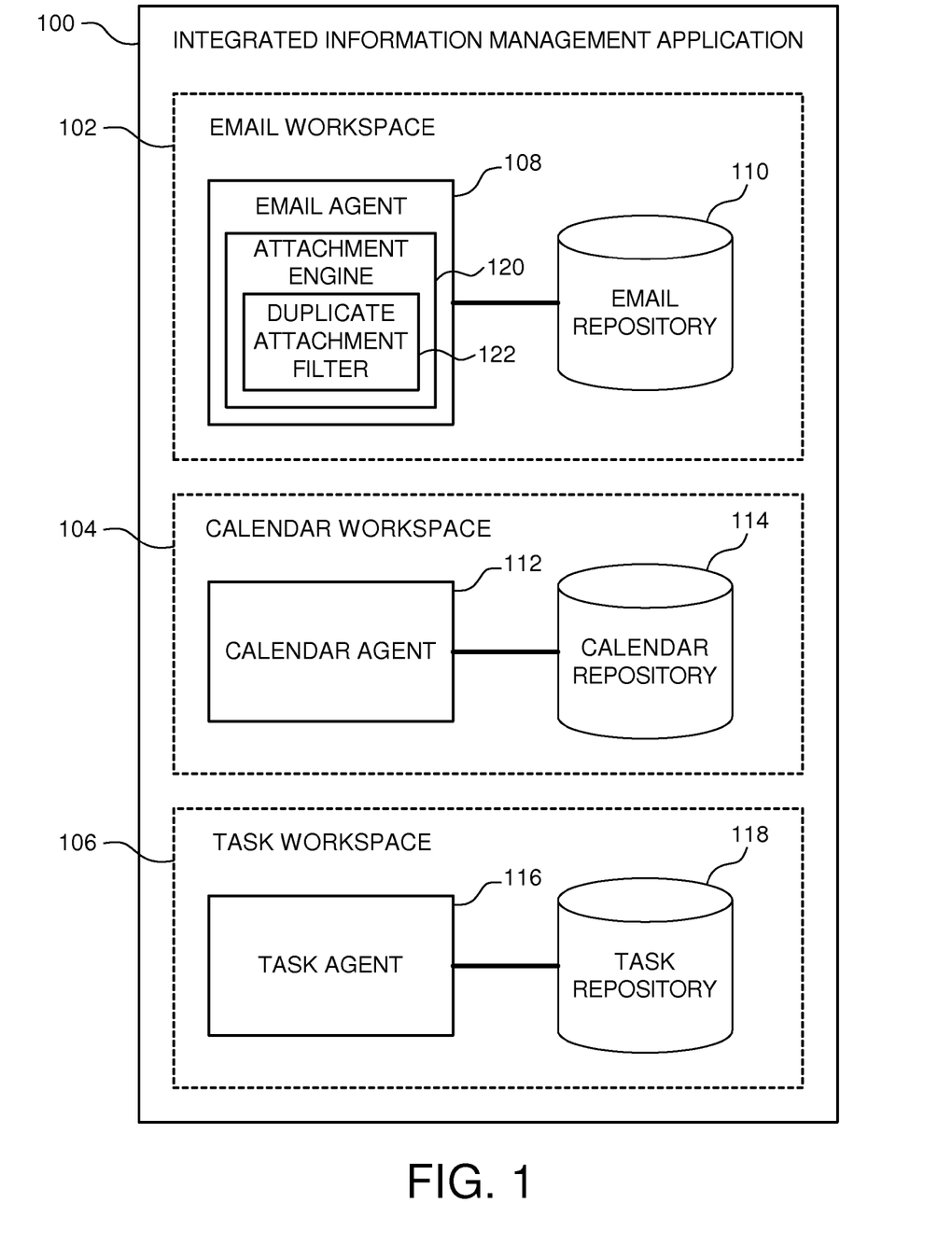
FIG. 1 depicts a schematic block diagram of one embodiment of an integrated information management system.

FIG. 1 depicts a schematic block diagram of one embodiment of an integrated information management system 100. The illustrated integrated information management system 100 includes an email workspace 102, a calendar workspace 104, and a task workspace 106. Although the depicted integrated information management system 100 is shown and described herein with certain components and functionality, other embodiments of the integrated information management system 100 may be implemented with fewer or more components or with less or more functionality. For example, some embodiments of the integrated information management system 100 may include a single workspace such as the email workspace 102 (or the calendar workspace 104 or the task workspace 106). Additionally, some embodiments of the integrated information management system 100 may include similar components arranged in another manner to provide similar functionality, in one or more aspects.

In one embodiment, the email workspace 102 includes an email agent 108 to facilitate email communications, including sending and receiving email messages. In particular, the email agent 108 may include a graphical interface to display email messages, a composer to allow a user to draft email messages, and a storage controller to store at least some of the email messages in an email repository 110. In some embodiments, the email repository 110 includes an electronic memory device or a data storage device within a computer system.

At least some of the email messages generated or received by the email agent 108 have attachments, which may be transmitted separately from or together with the corresponding email messages. Additionally, the email attachments may be stored in approximately the same location of the email repository 110 with the corresponding email messages, or in a separate part of the email repository 110, or a separate email attachment repository (not shown). In any case, the email messages and email attachments are stored in a location that is accessible to the email agent 108.

In one embodiment, the calendar workspace 104 includes a calendar agent 112 to facilitate scheduling of calendar activities. In particular, the calendar agent 112 may store a plurality of calendar entries such as appointments, meetings, and other scheduling activities. Calendar attachments are associated with at least some of the calendar entries. In some embodiments, the calendar entries and the calendar attachments are stored together or separately in a calendar, repository 114. Alternatively, the calendar entries and the calendar attachments may be stored in separate repositories.

In one embodiment, the task workspace 106 includes a task agent 116 and a task repository 118. The task agent 116 facilitates generating and tracking tasks. Task attachments may be associated with at least some of the tasks. In some embodiments, the tasks and the task attachments are stored together or separately in the task repository 118. Alternatively, the tasks and the task attachments may be stored in separate repositories.

Although the depicted integrated information management application 100 includes the email workspace 102, the calendar workspace 104, and the task workspace 106, other embodiments, of the integrated information management application 100 may include fewer or more workspaces. Additionally, at least some of the resources of each workspace may be shared among multiple workspaces. For example, some embodiments of the integrated information management system 100 store email messages and calendar entries on a single data repository. As another example, the attachments from all of the workspaces 102, 104, and 106 may be stored on a single data repository. Other configurations also may be implemented.

The depicted integrated information management application 100 also includes an attachment engine 120. Although the attachment engine 120 is shown coupled to the email agent 108, other embodiments of the integrated information management application 100 may implement the attachment engine 120 coupled to the calendar agent 112, the task agent 116, or an agent of another workspace. Alternatively, the attachment engine 120 may be implemented independently of the various workspaces.

Figure 2:
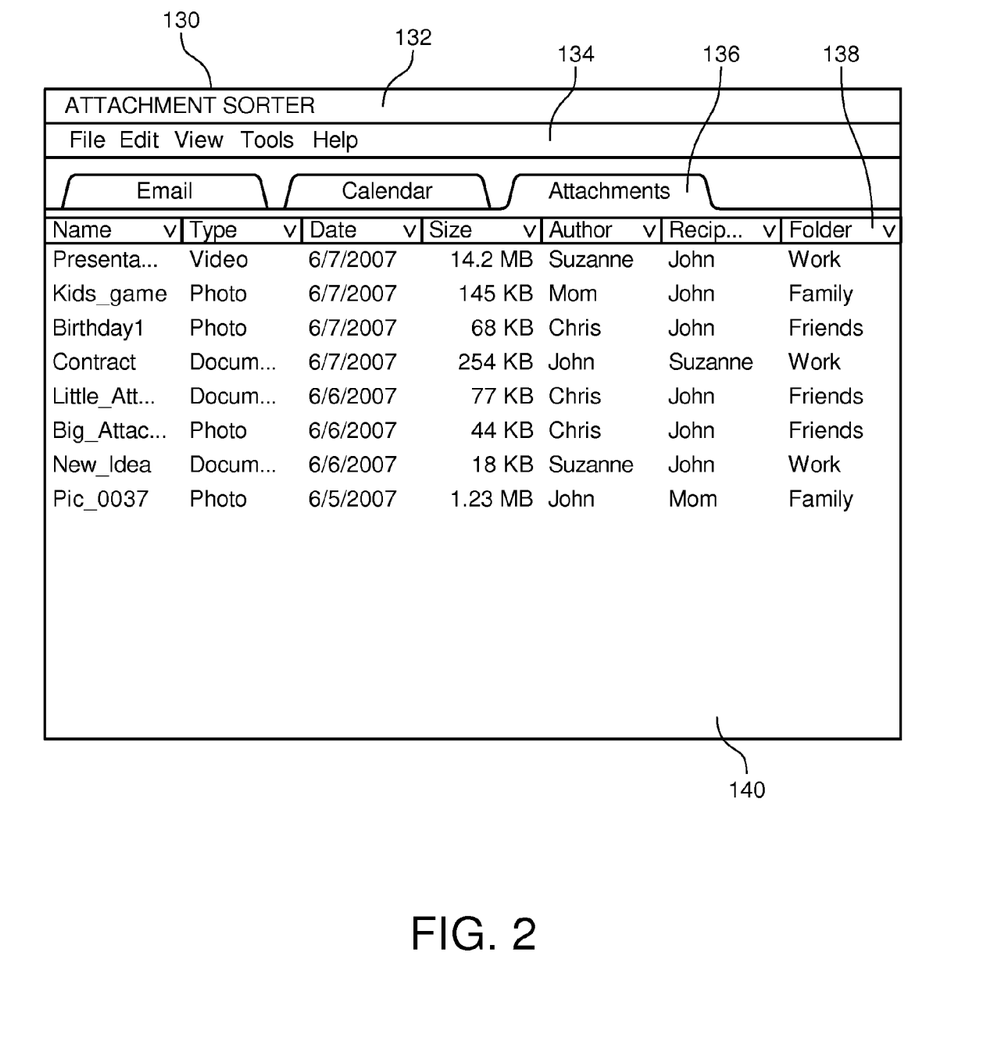
FIG. 2 depicts a schematic block diagram of one embodiment of an attachment sorting result interface for use with the attachment engine of FIG. 1.

In one embodiment, the attachment engine 120 is configured to search a data repository (e.g., the email repository 110) of the integrated information management application 100 for files, or items, with attachments. The files may be email messages, calendar entries, tasks, or another type of workspace item. Similarly, the attachments may be email attachments, calendar attachments, task attachments, or another type of attachment. The attachment engine 120 uses the search results to generate a list of the attachments within the data repository. After generating the list of attachments, or concurrently with generating the list of attachments, the attachment engine 120 sorts the list of attachments according to a sorting qualifier and displays the sorted list of attachments on a display device such as a computer monitor. An example of a sorted list of attachments is shown in FIG. 2 and described in more detail below.

Various types of sorting qualifiers may be used to sort the list of attachments. In some embodiments, the types of sorting qualifiers available for sorting the list of attachments depends at least in part on the types of attachments (e.g., email, calendar, task, etc.) that are included in the list of attachments. Where multiple types of attachments are included in a single list of attachments, the available sorting qualifiers may be only those sorting qualifiers that are common to all of the attachment types. Alternatively, all of the sorting qualifier for all of the attachments types in a list of attachments may be used, in which case the attachments without attributes corresponding to some of the sorting qualifiers of other attachments types may be assigned a default value for sorting purposes.

One exemplary sorting qualifier is a name qualifier related to the name of an attachment. Another exemplary sorting qualifier is a date qualifier related to a date and/or time attributed to the attachment. For example, the attributed date may be a file creation date, a file modification date, a send date, a receive date, or another date associated with the attachment.

Another exemplary sorting qualifier is a size qualifier related to the size of the attachment. In one embodiment, the size qualifier relates to the total attachment size for a workspace item. For example, the total attachment size of an email may be the total size of multiple attachments in a single email. Using a total attachment size qualifier facilitates sorting the attachments according to a total attachment size of multiple attachments associated with each workspace item. In another embodiment, the size qualifier relates to the individual size for each attachment, regardless of the total number of attachments associated with the same workspace item. For example, if an email includes five separate attachments, then the size of each attachment is tracked, rather than the sum total size of all five attachments together. Using an individual attachment size qualifier facilitates sorting the attachments according to individual attachment sizes of multiple attachments associated with each workspace item.

Another exemplary sorting qualifier is a type qualifier related to the file type of the attachment. Another exemplary sorting qualifier is an author qualifier related to an author of the workspace item (e.g., the sender of an email message) associated with the attachment. Another exemplary sorting qualifier is a recipient qualifier related to the recipient of the workspace item associated with the attachment. Another exemplary type of sorting qualifier is a category qualifier related to a category of the attachment. For example, the category may indicate a folder in which an email associated with the attachment is stored. Other embodiments may use other types of sorting qualifiers related to other attributes of the attachments and/or the workspace items.

In some embodiments, the attachment engine 120 also includes a duplicate attachment filter 122. The duplicate attachment filter 122 is configured to filter out duplicate attachments from the list of attachments. For example, multiple copies of the same email attachment may be associated with multiple email messages (e.g., one copy in an original message, another copy in a forwarded message, and another copy in a reply to the original message) in an email system. In some embodiments, a duplicate attachment may be identified as having identical attributes (e.g., name, size, contents) as another attachment. In other embodiments, a duplicate attachment may be identified as any attachment with one or more matching attachment attributes. For example, some embodiments of the duplicate attachment filter 122 may filter out attachments with identical names, even though the content and/or size of the attachments may be different This simplified filtering scheme may provide faster search results in at least some embodiments.

The duplicate attachment filter 122 filters out the duplicate copies of the email attachment so that only one copy of the email attachment is included in the resulting list of attachments. In one embodiment, the duplicate attachment filter 122 filters the duplicate attachments out so that they are not included in the list of attachments. In another embodiment, the duplicate attachment filter 122 filters the duplicate attachments out at some point after they have initially been included in the list of attachments.

In some embodiments, the attachment engine 120 is also configured to manage one or more compressed files within an attachment. In particular, the attachment engine 120 may identify a compressed file in an attachment, extract the compressed file from the attachment, and include the compressed file in the list of attachments. In some embodiments, the attachment engine 120 may decompress the compressed file. Alternatively, the attachment engine 120 may simply extract at least some of the attributes of the compressed file, without actually decompressing the compressed file.

In other embodiments, the attachment engine 120 may include the attributes of data compression format (e.g., with one or more compressed files using the data compression format), in its compressed form, in the list of attachments. In other words, the attributes of the compressed file attachment may be included in the-list of attachments, in addition to or instead of the attributes of the individual compressed files within the data compression format.

In some embodiments, the attachment engine 120 is also configured to manage one or more compressed files within, for example, the email repository 110. In particular, the attachment engine 120 may identify that a compressed file has been extracted from an email, find the extracted attachment in the email repository 110, and include the compressed file in the list of attachments. In some embodiments, the attachment engine 120 decompresses the compressed file. For embodiments which decompress the compressed file, the attachment engine 120 may recompress the attachment for storage in the email repository 110. Compression may be implemented using a standard compression algorithm or using the same compression algorithm that was original used to compress the compressed file. In another embodiment, the attachment engine 120 may extract one or more of the attributes of the compressed file, without actually decompressing the compressed file.

In some embodiments, the attachment engine 120 is also configured to facilitate searching for a search term within the name and/or content of an attachment. In particular, the attachment engine 120 searches the list of attachments for an attachment inclusive of a search term, such as a key word or phrase. In one embodiment, the attachment engine 120 facilitates displaying the name of the attachment inclusive of the search term for each hit matching the indicated search term. In some embodiments, the attachment engine 120 also facilitates displaying a contextual excerpt of the attachment inclusive of the search term. The contextual excerpt includes, for example, the search term and content (e.g., surrounding words, a preceding sentence, a paragraph of text, etc.) surrounding the search term.

In some embodiments, the attachment engine 120 is also configured to include an archived email attachment from an archived email file in the list of email attachments. For example, the attachment engine 120 searches a folder of archived emails and includes attachments that are associated with the archived emails. The archived emails or emails with deleted attachments may be stored with the emails that are not archived or in a separate location.

FIG. 2 depicts a schematic block diagram of one embodiment of an attachment sorting result interface 130 for use with the attachment engine 120 of FIG. 1. In particular, the attachment sorting result interface 130 shows the list generated by the attachment engine 120 within a graphical user interface (GUI) for display on a display device. It should be noted that other embodiments of the attachment sorting result interface 130 may be integrated with existing or new interfaces that are used to display related information.

The illustrated attachment sorting result interface 130 includes a title bar 132 to show a title of the attachment sorting result interface 130, a menu bar 134 to show possible menu selections within the attachment sorting result interface 130, and one or more tabbed viewing spaces 136 including an email viewing space, a calendar viewing space, and attachment viewing space 140. Other embodiments may include fewer or more tabbed viewing spaces 136. Although tabbed viewing spaces 136 are shown, other embodiments may use other types of viewing spaces to display the list of attachments. For example the list of attachments may be shown in a pop-up window. Alternatively, the list of attachments may be shown in a pane, or tile, of another viewing space such as the email viewing space.

The attachment viewing space 140 includes one or more attribute fields 138 that may be used for sorting the list of attachments within the attachment viewing space 140. Some exemplary attribute fields 138 include a document name attribute, a type attribute, a date attribute, and a size attribute. Other exemplary attribute fields 138 include an author attribute, a recipient attribute, a folder attribute, a subject attribute. Other embodiments may use other types of attributes. In some embodiments, the attribute fields 138 correspond to sorting qualifiers that are used to sort the list of attachments.

Additionally, some embodiments of the attachment sorting result interface 130 include different types of attribute fields 138. In one embodiment, a user selects one or more attribute fields 138 to display in the attachment sorting result interface 130. In another embodiment, the attachment engine 120 dynamically displays certain attribute fields 130 depending on the types of attachments in the list and/or the types of workspace items associated with the attachments.

As an example, the list of attachments shown in the attachment viewing space 140 of the attachment sorting result interface 130 is sorted by date. In particular, the attachments are listed by name in reverse chronological order based on the dates associated with each attachment. For attachments with the same date, the attachments are sorted by size from largest to smallest.

In some embodiments, a user may use the attachment sorting result interface 130 directly to sort the list of attachments based on one or more sorting qualifiers. For example, a user may select an attribute field 138 (e.g., by clicking on it with a mouse pointer) to sort the list of attachments by the corresponding sorting qualifier. A subsequent selection of the same attribute field 138 sorts the list of attachments in a reverse order.

Figure 3:
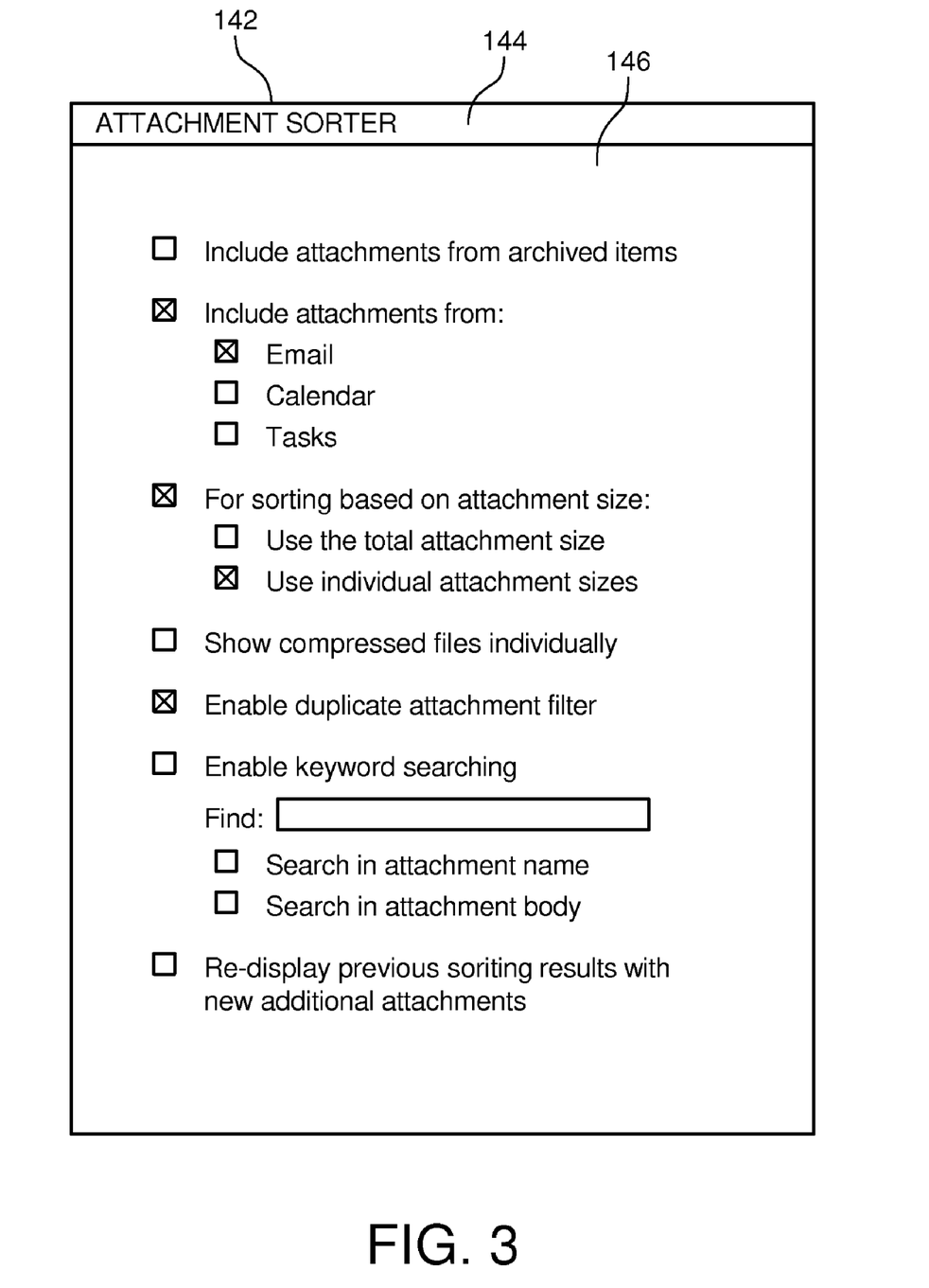
FIG. 3 depicts a schematic block diagram of one embodiment of an attachment sorting parameter interface for use with the attachment engine of FIG. 1.

FIG. 3 depicts a schematic block diagram of one embodiment of an attachment sorting parameter interface 142 for use with the attachment engine 120 of FIG. 1. In particular, the illustrated attachment sorting parameter interface 142 shows a plurality of list generation parameters that may be used by the attachment engine 120 to generate the list of attachments. Although the illustrated attachment sorting parameter interface 142 includes certain parameters, other embodiments may include fewer or more parameters. Additionally, some parameters may be selected, enabled, or disabled by a user. Other parameters may be selected, enabled, or disabled automatically by the attachment engine 120. It should also be noted that other embodiments of the attachment sorting parameter interface 142 may be integrated with existing or new interfaces for that are used to display related information.

The illustrated attachment sorting parameter interface 142 includes a title bar 144 to show a title of the attachment sorting parameter interface 142. The attachment sorting parameter interface 142 also includes a parameter selection space 146. The parameter selection space 146 includes one or more attachment sorting parameters that may be selected by a user or by the attachment engine 120. In one embodiment, selection of a sorting parameter invokes a sorting request to sort two or more email attachments according to the sorting parameter selections. Alternative, the sorting request may be invokes in another manner. For example, some embodiments invoke the sorting request in response to selection of one or more of the attribute fields 138 of the attachment sorting result interface 130.

An exemplary attachment sorting parameter is a parameter to include or exclude attachments from archived items. Another exemplary attachment sorting parameter is a parameter to include or exclude attachments from each of the workspaces such as the email workspace 102, the calendar workspace 104, and the task workspace 106. Another exemplary attachment sorting parameter is a parameter to indicate the size qualifier (e.g., the total size or the individual sizes of multiple attachments) for sorting the attachments based on size. Another exemplary attachment sorting parameter is a parameter to show individual compressed files within a compression file attachment. Another exemplary attachment sorting parameter is a parameter to enable the duplicate attachment filter 122 to filter out duplicate attachments from the list of attachments. Another exemplary attachment sorting parameter is a parameter to enable searching for a search term in the attachment name and/or in the attachment content. Another exemplary attachment sorting parameter is a parameter to enable re-displaying of previous sorting results with any new additional attachments which may have been saved, for example, in the email repository 110 since the last attachment sorting operation was performed.

Figure 4:
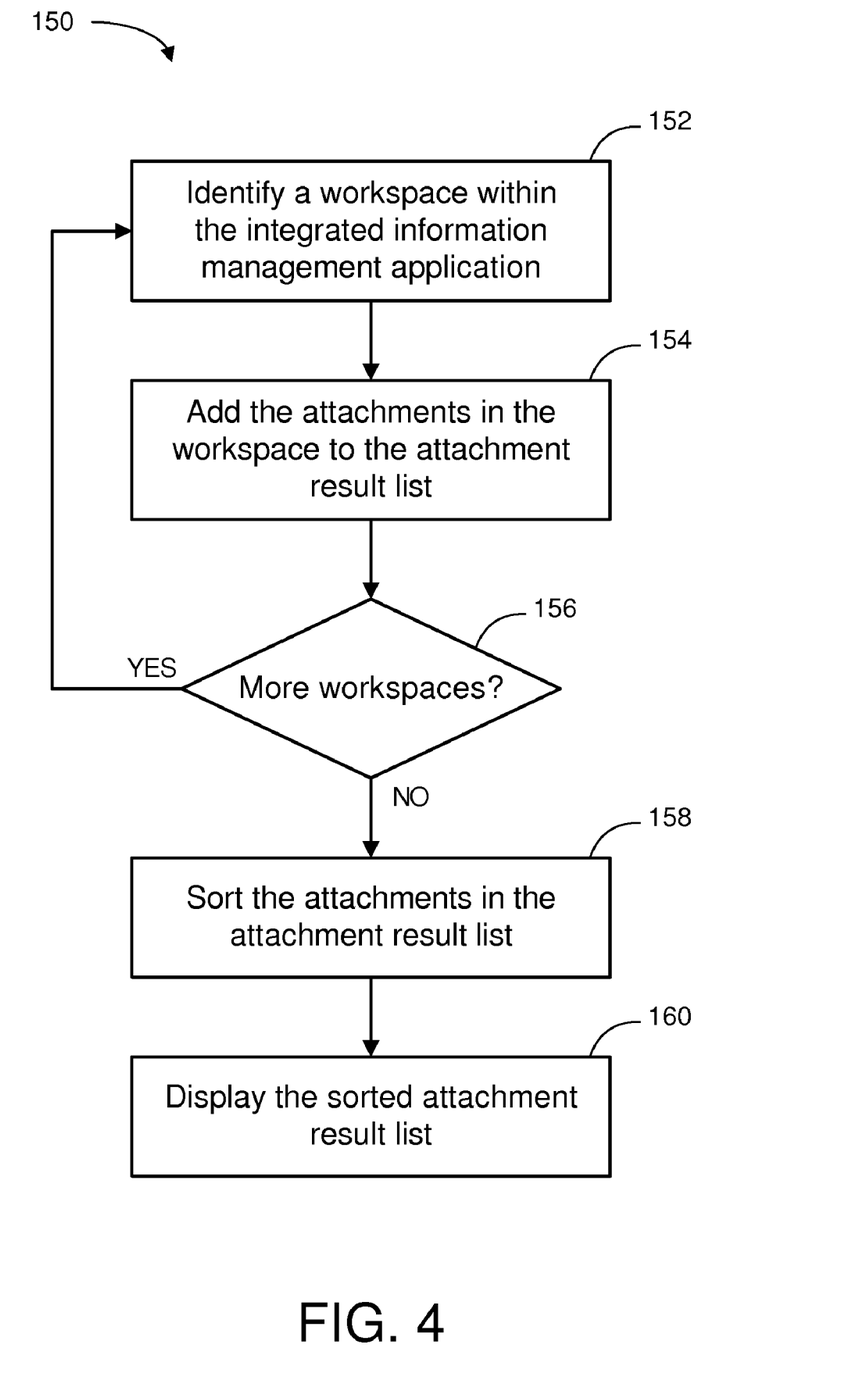
FIG. 4 depicts a schematic flow chart diagram of one embodiment of an attachment sorting method for use with the attachment engine of FIG. 1.

FIG. 4 depicts a schematic flow chart diagram of one embodiment of an attachment sorting method 150 for use with the attachment engine 120 of FIG. 1. For ease of explanation, the attachment sorting method 150 is described with reference to the attachment engine 120 of FIG. 1. However, some embodiments of the attachment sorting method 150 may be implemented with other attachment engines. Additionally, the attachment sorting method 150 is described in conjunction with the attachment sorting result interface 130 of FIG. 2 and the attachment sorting parameter interface 142 of FIG. 3, but some embodiments of the attachment sorting method 150 may be implemented with other attachment sorting result and parameter interfaces.

In the illustrated attachment sorting method 150, the attachment engine 120 identifies 152 a workspace within the integrated information management application 100. For example, the attachment engine 120 may identify the email workspace 102, the calendar workspace 104, the task workspace 106, or another workspace. The attachment engine 120 then adds 154 the attachments in the identified workspace to an attachment result list, or list of the attachments. In some embodiments, the attachment engine 120 searches a data repository (e.g., the email repository 110) of the integrated information management application 100 for files with attachments and generates a list of the attachments within the data repository. A more detailed embodiment of the attachment addition operation 154 is shown in FIG. 5 and described below.

After adding all of the attachments for the identified workspace to the attachment result list, the attachment engine 120 determines 156 if there are additional workspaces and, if so, repeats the described operations for each additional workspace. In some embodiments, the attachment engine 120 searches only the workspaces indicated by the corresponding attachment sorting parameters.

In one embodiment, after cycling through all of the workspaces, according to the corresponding attachment sorting parameters, the attachment engine 120 sorts 158 the attachments in the attachment result list. In one embodiment, the attachment engine 120 sorts the list of attachments according to a sorting qualifier. Alternatively, the attachment engine 120 may sort the list of attachments according to more then one sorting qualifier. In another embodiment, the attachment engine 120 sorts the attachments as they are added to the attachment result list. In other words, each new attachment is added to the attachment result list in a sorted order according to one or more sorting qualifiers, rather than adding the attachments in an unsorted order and sorting the entire list after the list is complete. Other embodiments may implement other types of sorting techniques. Once the list of attachments is sorted, the attachment engine 120 displays 160 the sorted attachment result list. In one embodiment, the attachment engine 120 displays the sorted list of attachments on a display device. Other embodiments may display all or part of the attachment result list prior to completion of the sorting operations. Additionally, the attachment engine 120 may search the list of attachments for an attachment inclusive of a search term and display a name of the attachment inclusive of a search term, if searching is enabled. In some embodiments, the attachment engine 120 also displays a contextual excerpt of the attachment. In other words, the attachment engine 120 displays content surrounding the search term, in addition to just the search term. The depicted attachment sorting method 150 then ends.

Figure 5:
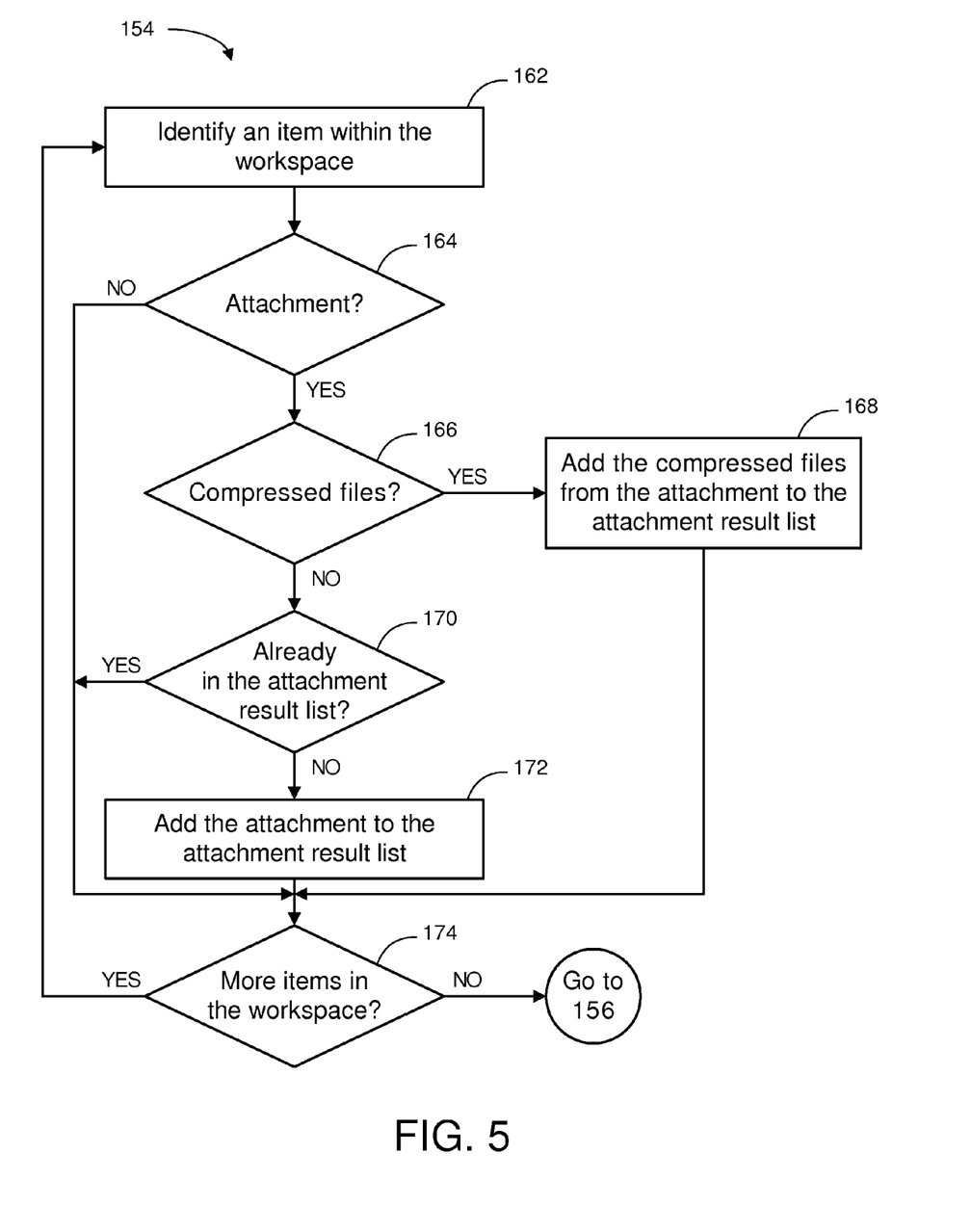
FIG. 5 depicts a schematic flow chart diagram of a more detailed embodiment of the attachment addition operation in the attachment sorting method of FIG. 4.

FIG. 5 depicts a schematic flow chart diagram of a more detailed embodiment of the attachment addition operation 154 in the attachment sorting method 150 of FIG. 4. For ease of explanation, the attachment addition operation 154 is described with reference to the attachment engine 120 of FIG. 1. However, some embodiments of the attachment addition operation 154 may be implemented with other attachment engines. Additionally, the attachment addition operation 154 is described in conjunction with the attachment sorting method 150 of FIG. 4, but some embodiments of the attachment addition operation 154 may be implemented with other attachment sorting methods.

Figure 6:
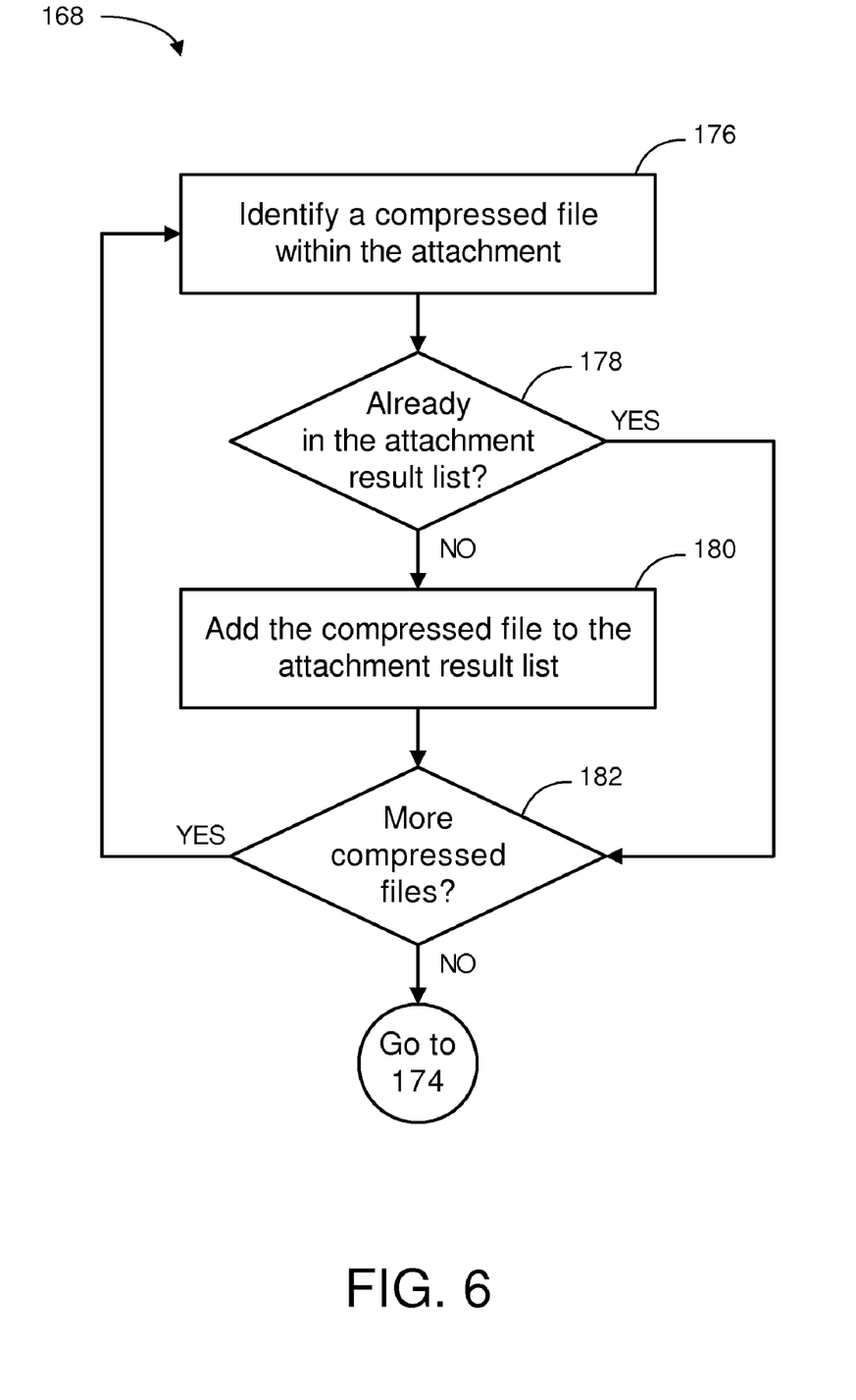
FIG. 6 depicts a schematic flow chart diagram of a more detailed embodiment of the compressed file operation in the attachment addition operation of FIG. 5.

In the illustrated attachment addition operation 154, the attachment engine 120 identifies 162 an item within the current workspace. For example, the attachment engine 120 may identify an email file within the email workspace 102. The attachment engine 120 then determines 164 if there is an attachment associated with the identified item. If there is an attachment associated with the identified item, then the attachment engine 120 determines 166 if the attachment includes one or more compressed files and, if so, adds 168 the compressed files from the attachment to the attachment result list. In order to add the compressed files to the attachment result list, in one embodiment the attachment engine 120 extracts a compressed file from the attachment and includes the compressed file in the list of attachments. A more detailed embodiment of the compressed file operation 168 is shown in FIG. 6 and described below. In some embodiments, the determination operation 166 also determines if an attachment has been removed and saved in an attachment database or repository such as the email repository 110.

If the attachment does not include compressed files, then the attachment engine 120 determines 170 if a copy of the attachment is already in the attachment result list. In one embodiment, the attachment engine 120 invoices the duplicate attachment filter 122 to determine 170 if there is already a copy of the identified attachment in the list of attachments. As explained above, the copy may be an exact duplicate (i.e., identical in all aspects) or a duplicate of less than all of the attachment attributes. If the attachment result list does not already include a copy of the identified attachment, then the attachment engine 120 adds 172 the identified attachment to the attachment result list. After adding 172 the attachment to the attachment result list, or adding 168 compressed files from the identified attachment to the attachment result list, or determining 164 that the identified item does not have an associated attachment, the attachment engine 120 determines 174 if there are more items in the identified workspace. The attachment engine 120 continues to process each item in the workspace in a similar manner until all items are processed, at which point the attachment engine 120 proceeds to the determination operation 156 of FIG. 4, as described above.

FIG. 6 depicts a schematic flow chart diagram of a more detailed embodiment of the compressed file operation 168 in the attachment addition operation 154 of FIG. 5. For ease of explanation, the compressed file operation 168 is described with reference to the attachment engine 120 of FIG. 1. However, some embodiments of the compressed file operation 168 may be implemented with other attachment engines. Additionally, the compressed file operation 168 is described in conjunction with the attachment sorting method 150 attachment of FIG. 1, but some embodiments of the compressed file operation 168 may be implemented with other attachment sorting methods. Also, it should be noted that the individual files within a compressed file attachment are also referred to as attachments, so an attachment may contain one or more additional attachments, for example, in the form compressed files. Additionally, it should be noted that the compressed file operation 168 may be implemented for files that have been removed from the corresponding email (or calendar entry or task) and stored in the corresponding repository.

In the illustrated compressed file operation 168, the attachment engine 120 identifies 176 a compressed file within the attachment The attachment engine 120 then determines 178 if a copy of the attachment (i.e., the compressed file) is already in the attachment result list. In one embodiment, the attachment engine 120 invokes the duplicate attachment filter 122 to determine 178 if there is already a copy of the identified attachment in the list of attachments. If the attachment result list does not already include a copy of the identified attachment (i.e., the compressed file), then the attachment engine 120 adds 180 the identified attachment to the attachment result list.

After adding 180 the compressed file to the attachment result list, or after determining 178 that a copy of the compressed file is already in the attachment result list, the attachment engine 120 determines 182 if there are more compressed files in the attachments and, if so, continues to process each compressed file in the attachment in a similar manner until all compressed files are processed. After determining 182 that there are no more compressed files in the identified attachment, the attachment engine 120 proceeds to the determination operation 174 of FIG. 5, as described above.

Figure 7:
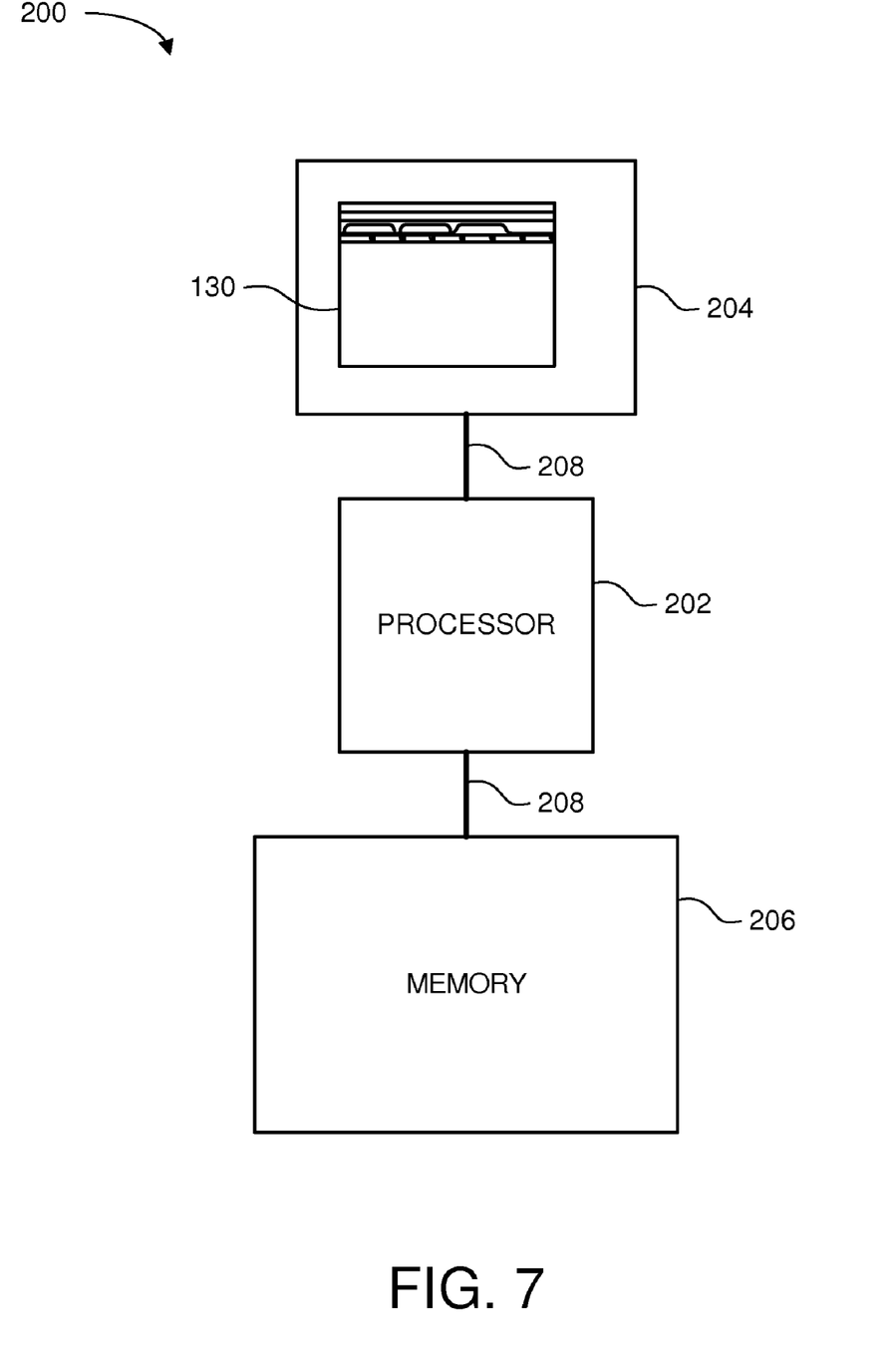
FIG. 7 depicts a schematic block diagram of one embodiment of a computer system for implementation of the attachment engine of FIG. 1.

FIG. 7 depicts a schematic block diagram of one embodiment of a computer system 200 for implementation of the attachment engine 120 of FIG. 1. Although the depicted computer system 200 is shown and described herein with certain components and functionality, other embodiments of the computer system 200 may be implemented with fewer or more components or with less or more functionality. Additionally, some embodiments of the computer system 200 may include similar components arranged in another manner to provide similar functionality, in one or more aspects.

The illustrated computer system 200 includes a processor 202, a display device 204, and an electronic memory device 206. One or more bus interfaces 208 are coupled to the processor 202, the display device 204, the electronic memory device 206, and other components within the computer system 200. The bus interfaces 208 may be configured for simplex or duplex communications of data, address, and/or control information.

In one embodiment, the processor 202 is a central processing unit (CPU). In other embodiments, the processor 202 is a graphical processing unit (GPU) or another type of processing device such as a general purpose processor, an application specific processor, a multi-core processor, or a microprocessor. Alternatively, a separate GPU may be coupled to the display device 204. In general, the processor 202 executes one or more instructions to provide operational functionality to the computer system 200. The instructions may be stored locally in the processor 202 or in the electronic memory device 206. Alternatively, the instructions may be distributed across one or more devices such as the processor 202, the electronic memory device 206, or another data storage device.

In some embodiments, the electronic memory device 206 is a random access memory (RAM) or another type of dynamic storage device. In other embodiments, the electronic memory device 206 is a read-only memory (ROM) or another type of static storage device. In other embodiments, the illustrated memory device 206 is representative of both RAM and static storage memory within a single computer system 200. In other embodiments, the electronic memory device 206 is an electronically programmable read-only memory (EPROM) or another type of storage device. Additionally, some embodiments store the instructions as firmware such as embedded foundation code, basic input/output system (BIOS) code, or other similar code.

In some embodiments, the display device 204 is a graphical display such as a cathode ray tube (CRT) monitor, a liquid crystal display (LCD) monitor, or another type of display device. In one embodiment, the display device 204 is configured to convey a visual representation of the attachment result list, or the list of attachments. Additionally, the display device 204 may be configured to display the attachment sorting result interface 130 and the attachment sorting parameter interface 142.

It should also be noted that at least some of the operations for the attachment sorting method 150 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to search a data repository of an integrated information management application for files with attachments, an operation to generate a list of the attachments within the data repository, an operation to sort the list of attachments according to a sorting qualifier, and an operation to display the sorted list of attachments on a display device.

Another embodiment of the computer program product includes an operation to filter out duplicate attachments from the list of attachments. Another embodiment includes an operation to extract a compressed file from at least one of the attachments and include the compressed file in the list of attachments. Another embodiment includes operations to search the list of attachments for an attachment inclusive of a search term, display a name of the attachment inclusive of the search term, and display a contextual excerpt of the attachment inclusive of the search term. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
   an email agent within an integrated information management application;

an email repository coupled to the email agent, the email repository to store a plurality of email files and a plurality of existing email attachments, wherein the existing email attachments have prior associations with at least some of the email files; and an attachment engine coupled to the email agent, the attachment engine to generate a list of existing attachments from at least two workspaces of a plurality of workspaces within the integrated information management application, wherein the plurality of workspaces comprises an email workspace, a calendar workspace, and a task workspace, wherein the existing attachments comprise the existing email attachments within the email repository for visual communication on a display device.

2. The system of claim 1, wherein the attachment engine is further configured to sort the email attachments within the list according to a sorting qualifier, wherein the sorting qualifier comprises a document name qualifier, a date qualifier, a size qualifier, a type qualifier, an author qualifier, a recipient qualifier, or a category qualifier.

3. The system of claim 2, wherein the size qualifier comprises an individual attachment size qualifier to facilitate sorting the email attachments according to individual attachment sizes of multiple attachments associated with each email file.

4. The system of claim 2, wherein the size qualifier comprises a total attachment size qualifier to facilitate sorting the email attachments according to a total attachment size of multiple attachments associated with each email file.

5. The system of claim 1, further comprising:
a calendar agent coupled to the email agent;
a task agent coupled to the email agent;
a calendar repository coupled to the calendar agent and the attachment engine, the calendar repository to store a plurality of calendar entries and a plurality of existing calendar attachments, wherein the calendar attachments have prior associations with at least some of the calendar entries; and
a task repository coupled to the task agent and the attachment engine, the task repository to store a plurality of task entries and a plurality of existing task attachments, wherein the existing task attachments have prior associations with at least some of the task entries, wherein the attachment engine is further configured to generate a list of the existing calendar attachments within the calendar repository and a list of the existing task attachments within the task repository and to combine the list of the existing email attachments, the list of the existing calendar attachments, and the list of the existing task attachments into a single list of existing attachments for visual communication on the display device.

6. The system of claim 1, further comprising a duplicate attachment filter coupled to the attachment engine, the duplicate attachment filter to filter out duplicate email attachments from the list of email attachments.

7. The system of claim 1, wherein the attachment engine is further configured to extract a compressed file from at least one of the email attachments and to include the compressed file in the list of email attachments.

8. The system of claim 1, wherein the attachment engine is further configured to include an archived email attachment from an archived email file in the list of email attachments.

9. The system of claim 1, wherein the email agent is further configured to display the list of email attachments in a separate pop-up window or a separate tabbed viewing space within a graphical user interface of the integrated information management application.

10. The system of claim 1, wherein the attachment engine is further configured to enable searching of attachment names and attachment content of the email attachments in the list of email attachments.

11. A method comprising:
searching a data repository of an integrated information management application for files with existing attachments, wherein the existing attachments are previously associated with corresponding workspace items;
generating a list of the existing attachments within the data repository, wherein the list comprises existing attachments from at least two workspaces of a plurality of workspaces within the integrated information management application, wherein the plurality of workspaces comprises an email workspace, a calendar workspace, and a task workspace;
sorting the list of existing attachments according to a sorting qualifier; and
displaying the sorted list of existing attachments on a display device.

12. The method of claim 11, wherein the sorting qualifier comprises a name qualifier, a date qualifier, a size qualifier, a type qualifier, an author qualifier, a recipient qualifier, or a category qualifier.

13. The method of claim 11, further comprising filtering out duplicate attachments from the list of attachments.

14. The method of claim 11, further comprising recognizing a deleted email attachment from the list of email attachments.

15. The method of claim 11, wherein generating the list of attachments further comprises:
extracting a compressed file from at least one of the attachments; and
including the compressed file in the list of attachments.

16. The method of claim 11, further comprising:
searching the list of attachments for an attachment inclusive of a search term;
displaying a name of the attachment inclusive of the search term; and
displaying a contextual excerpt of the attachment inclusive of the search term, wherein the contextual excerpt comprises the search term and content surrounding the search term.

17. A computer program product comprising a non-transitory computer useable storage medium to store a computer readable program that, when executed on a computer, causes the computer to perform operations comprising:
search a data repository of an integrated information management application for files with existing attachments, wherein the existing attachments are previously associated with corresponding workspace items;
generate a list of the existing attachments within the data repository, wherein the list comprises existing attachments from at least two workspaces of a plurality of workspaces within the integrated information management application, wherein the plurality of workspaces comprises an email workspace, a calendar workspace, and a task workspace;
sort the list of existing attachments according to a sorting qualifier; and
display the sorted list of existing attachments on a display device.

18. The computer program product of claim 17, wherein the computer readable program, when executed on the computer, causes the computer to perform an operation to filter out duplicate attachments from the list of attachments.

19. The computer program product of claim 17, wherein the computer readable program, when executed on the computer, causes the computer to perform operations to extract a compressed file from at least one of the attachments and include the compressed file in the list of attachments.

20. The computer program product of claim 17, wherein the computer readable program, when executed on the computer, causes the computer to perform operations to search the list of attachments for an attachment inclusive of a search term, display a name of the attachment inclusive of the search term, and display a contextual excerpt of the attachment inclusive of the search term, wherein the contextual excerpt comprises the search term and content surrounding the search term.

* * * * *